United States Patent
Goren

(10) Patent No.: US 8,985,462 B2
(45) Date of Patent: Mar. 24, 2015

(54) METHOD OF DRIVING FOCUSING ELEMENT IN BARCODE IMAGING SCANNER

(71) Applicant: Symbol Technologies, Inc., Schaumburg, IL (US)

(72) Inventor: David P. Goren, Smithtown, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 5 days.

(21) Appl. No.: 13/713,497

(22) Filed: Dec. 13, 2012

(65) Prior Publication Data

US 2014/0166758 A1 Jun. 19, 2014

(51) Int. Cl.
| | |
|---|---|
| G06K 7/00 | (2006.01) |
| G06K 7/10 | (2006.01) |
| G06K 7/14 | (2006.01) |
| G06K 9/24 | (2006.01) |
| G03B 3/10 | (2006.01) |
| G02B 3/10 | (2006.01) |
| G02B 26/08 | (2006.01) |

(52) U.S. Cl.
CPC ............. *G06K 7/10811* (2013.01); *G02B 3/10* (2013.01); *G06K 2207/1011* (2013.01); *G06K 7/10801* (2013.01)
USPC ...... 235/462.22; 235/435; 235/439; 235/454; 235/462.01; 235/462.2; 235/462.21; 235/462.23; 235/494

(58) Field of Classification Search
CPC .......... G06K 7/10801; G06K 7/10811; G06K 2207/1011
USPC ................. 235/435, 439, 454, 462.01, 462.2, 235/462.21, 494, 462.22, 462.23
See application file for complete search history.

(56) References Cited

U.S. PATENT DOCUMENTS

| | | | |
|---|---|---|---|
| 5,473,150 A | 12/1995 | Huhn | |
| 6,060,722 A | 5/2000 | Havens et al. | |
| 6,336,587 B1* | 1/2002 | He et al. .................... | 235/462.45 |
| 6,340,114 B1* | 1/2002 | Correa et al. ............. | 235/462.22 |
| 6,688,525 B1* | 2/2004 | Nelson et al. ............. | 235/462.21 |
| 6,981,642 B2 | 1/2006 | Krichever | |
| 7,182,260 B2 | 2/2007 | Gurevich et al. | |
| 7,296,749 B2 | 11/2007 | Massieu | |
| 7,303,131 B2 | 12/2007 | Carlson et al. | |
| 7,347,371 B2 | 3/2008 | Joseph et al. | |
| 7,905,414 B2 | 3/2011 | Giebel et al. | |
| 8,366,001 B2* | 2/2013 | Craen et al. ................... | 235/454 |

(Continued)

OTHER PUBLICATIONS

International Search Report & Written Opinion mailed Mar. 24, 2014 in counterpart PCT application PCT/2013/071573.

*Primary Examiner* — Thien M Le
*Assistant Examiner* — Claude J Brown
(74) *Attorney, Agent, or Firm* — Nong-Qiang Fan

(57) ABSTRACT

A method includes the following: (1) detecting light from a target object to capture multiple images of the target object while substantially maintaining the distance between the target object and the imaging lens arrangement that is configured to have a focus position thereof changed with a lens-driving-parameter; (2) processing the at least one of the multiple images to determine a feature-size in an aiming pattern; (3) processing at least two of the multiple images to find an optimal lens-driving-parameter that results in the maximum image sharpness; and (4) storing both the feature-size and the optimal lens-driving-parameter into a memory.

20 Claims, 15 Drawing Sheets

(56) References Cited

U.S. PATENT DOCUMENTS

| | | |
|---|---|---|
| 2004/0118919 A1* | 6/2004 | Breytman et al. ............. 235/454 |
| 2006/0038017 A1* | 2/2006 | Carlson et al. ........... 235/462.24 |
| 2006/0118635 A1 | 6/2006 | Joseph et al. |
| 2007/0063048 A1* | 3/2007 | Havens et al. ........... 235/462.46 |
| 2007/0080280 A1* | 4/2007 | Havens ..................... 250/201.1 |
| 2007/0131770 A1* | 6/2007 | Nunnink ....................... 235/454 |
| 2009/0072037 A1* | 3/2009 | Good et al. .............. 235/462.35 |
| 2009/0095815 A1* | 4/2009 | He ........................... 235/462.41 |
| 2009/0166426 A1* | 7/2009 | Giebel et al. ............ 235/462.42 |
| 2009/0206158 A1* | 8/2009 | Thuries et al. ................ 235/454 |
| 2010/0314448 A1 | 12/2010 | Thuries et al. |
| 2011/0290886 A1* | 12/2011 | Carlson ................... 235/462.24 |

\* cited by examiner

METHOD OF DRIVING FOCUSING ELEMENT IN BARCODE IMAGING SCANNER

FIELD OF THE DISCLOSURE

The present disclosure relates generally to imaging-based barcode scanners.

BACKGROUND

Various electro-optical systems have been developed for reading optical indicia, such as barcodes. A barcode is a coded pattern of graphical indicia comprised of a series of bars and spaces of varying widths. In a barcode, the bars and spaces have differing light reflecting characteristics. Some of the barcodes have a one-dimensional structure in which bars and spaces are spaced apart in one direction to form a row of patterns. Examples of one-dimensional barcodes include Uniform Product Code (UPC), which is typically used in retail store sales. Some of the barcodes have a two-dimensional structure in which multiple rows of bar and space patterns are vertically stacked to form a single barcode. Examples of two-dimensional barcodes include Code 49 and PDF417.

Systems that use one or more imaging sensors for reading and decoding barcodes are typically referred to as imaging-based barcode readers, imaging scanners, or imaging readers. An imaging sensor generally includes a plurality of photosensitive elements or pixels aligned in one or more arrays. Examples of imaging sensors include charged coupled devices (CCD) or complementary metal oxide semiconductor (CMOS) imaging chips.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
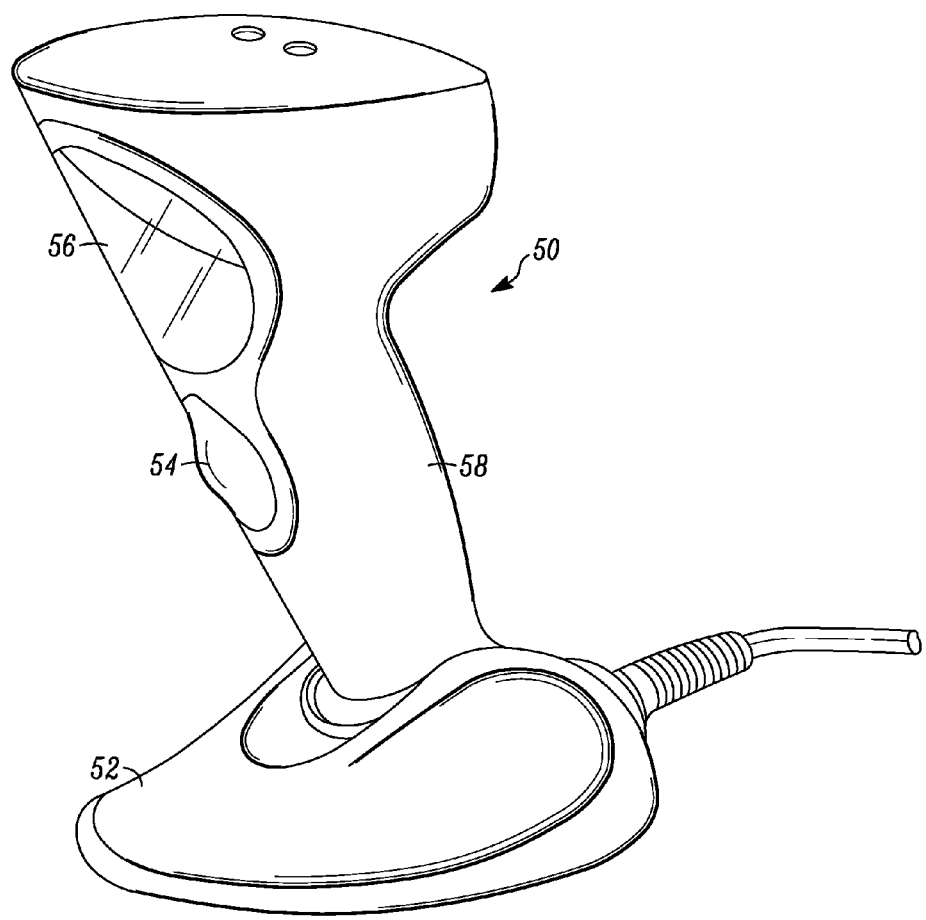
FIG. 1 shows an imaging scanner in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 shows an imaging scanner 50 in accordance with some embodiments. The imaging scanner 50 has a window 56 and a housing 58 with a handle. The imaging scanner 50 also has a base 52 for supporting itself on a countertop. The imaging scanner 50 can be used in a hands-free mode as a stationary workstation when it is placed on the countertop. The imaging scanner 50 can also be used in a handheld mode when it is picked up off the countertop and held in an operator's hand. In the hands-free mode, products can be slid, swiped past, or presented to the window 56. In the handheld mode, the imaging scanner 50 can be moved towards a barcode on a product, and a trigger 54 can be manually depressed to initiate imaging of the barcode. In some implementations, the base 52 can be omitted, and the housing 58 can also be in other shapes. In FIG. 1, a cable is also connected to the base 52. In other implementations, when the cable connected to the base 52 is omitted, the imaging scanner 50 can be powered by an on-board battery and it can communicate with a remote host by a wireless link.

Figure 2:
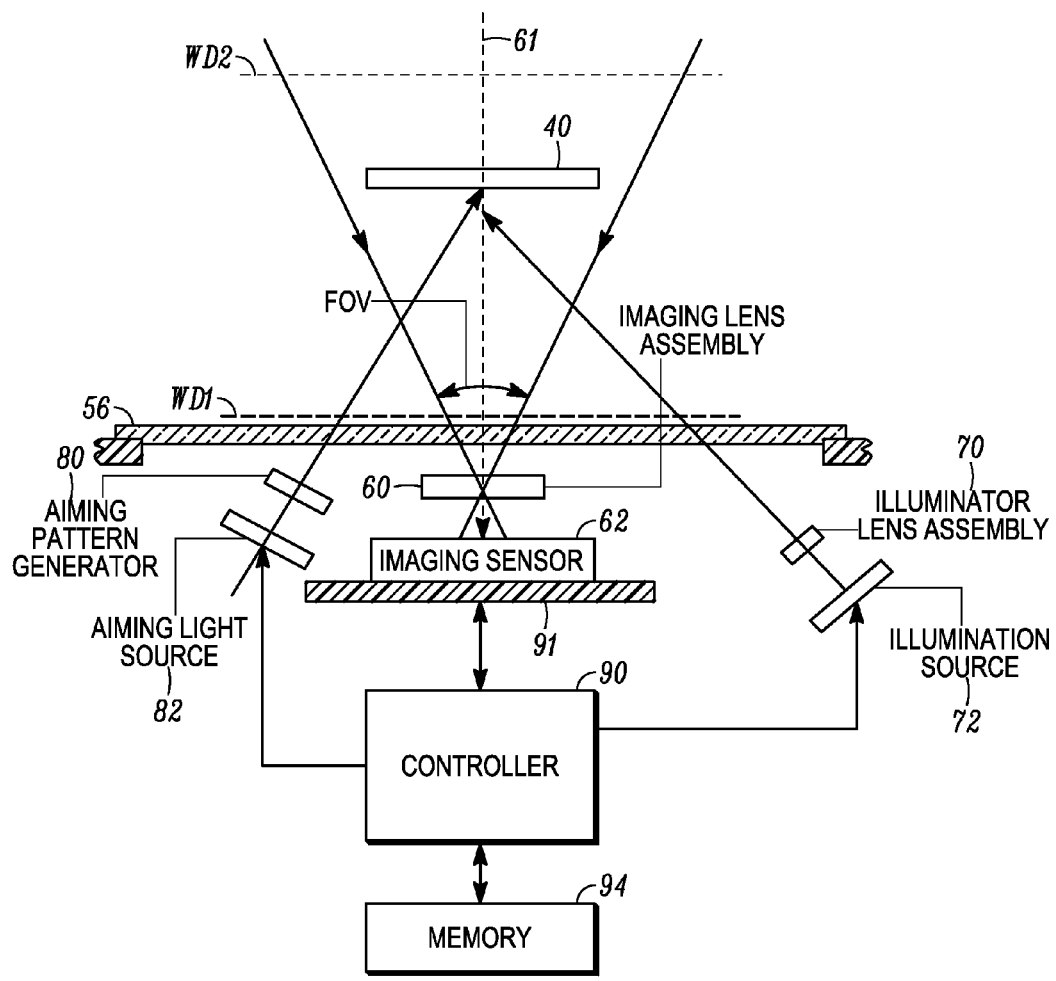
FIG. 2 is a schematic of an imaging scanner in accordance with some embodiments.

FIG. 2 is a schematic of an imaging scanner 50 in accordance with some embodiments. The imaging scanner 50 in FIG. 2 includes the following components: (1) an imaging sensor 62 positioned behind an imaging lens arrangement 60; (2) an illuminating lens arrangement 70 positioned in front of an illumination source 72; (3) an aiming pattern generator 80 positioned in front of an aiming light source 82; and (4) a controller 90. In FIG. 2, the imaging lens arrangement 60, the illuminating lens arrangement 70, and the aiming pattern generator 80 are positioned behind the window 56. The imaging sensor 62 is mounted on a printed circuit board 91 in the imaging scanner.

The imaging sensor 62 can be a CCD or a CMOS imaging device. The imaging sensor 62 generally includes multiple pixel elements. These multiple pixel elements can be formed by a one-dimensional array of photosensitive elements arranged linearly in a single row. These multiple pixel elements can also be formed by a two-dimensional array of photosensitive elements arranged in mutually orthogonal rows and columns. The imaging sensor 62 is operative to detect light captured by an imaging lens arrangement 60 along an optical path or axis 61 through the window 56. Generally, the imaging sensor 62 and the imaging lens arrangement 60 are designed to operate together for capturing light scattered or reflected from a barcode 40 as pixel data over a two-dimensional imaging field of view (FOV).

The barcode 40 generally can be located anywhere in a working range of distances between a close-in working distance (WD1) and a far-out working distance (WD2). In one specific implementation, WD1 is in a close proximity to the window 56, and WD2 is about a couple of feet from the window 56. Some of the imaging scanners can include a range finding system for measuring the distance between the barcode 40 and the imaging lens arrangement 60. Some of the imaging scanners can include an auto-focus system to enable a barcode be more clearly imaged with the imaging sensor 62 based on the measured distance of this barcode. In some implementations of the auto-focus system, the focus length of the imaging lens arrangement 60 is adjusted based on the measured distance of the barcode. In some other implementations of the auto-focus system, the distance between the imaging lens arrangement 60 and the imaging sensor 62 is adjusted based on the measured distance of the barcode.

In FIG. 2, the illuminating lens arrangement 70 and the illumination source 72 are designed to operate together for generating an illuminating light towards the barcode 40 during an illumination time period. The illumination source 72 can include one or more light emitting diodes (LED). The illumination source 72 can also include a laser or other kind of light sources. The aiming pattern generator 80 and the aiming light source 82 are designed to operate together for generating a visible aiming light pattern towards the barcode 40. Such aiming pattern can be used by the operator to accurately aim the imaging scanner at the barcode. The aiming light source 82 can include one or more light emitting diodes (LED). The aiming light source 82 can also include a laser, LED, or other kind of light sources.

In FIG. 2, the controller 90, such as a microprocessor, is operatively connected to the imaging sensor 62, the illumination source 72, and the aiming light source 82 for controlling the operation of these components. The controller 90 can also be used to control other devices in the imaging scanner. The imaging scanner 50 includes a memory 94 that can be accessible by the controller 90 for storing and retrieving data. In many embodiments, the controller 90 also includes a decoder for decoding one or more barcodes that are within the imaging field of view (FOV) of the imaging scanner 50. In some implementations, the barcode 40 can be decoded by digitally processing a captured image of the barcode with a microprocessor.

In operation, in accordance with some embodiments, the controller 90 sends a command signal to energize the illumination source 72 for a predetermined illumination time period. The controller 90 then exposes the imaging sensor 62 to capture an image of the barcode 40. The captured image of the barcode 40 is transferred to the controller 90 as pixel data. Such pixel data is digitally processed by the decoder in the controller 90 to decode the barcode. The information obtained from decoding the barcode 40 is then stored in the memory 94 or sent to other devices for further processing.

Figure 3A:
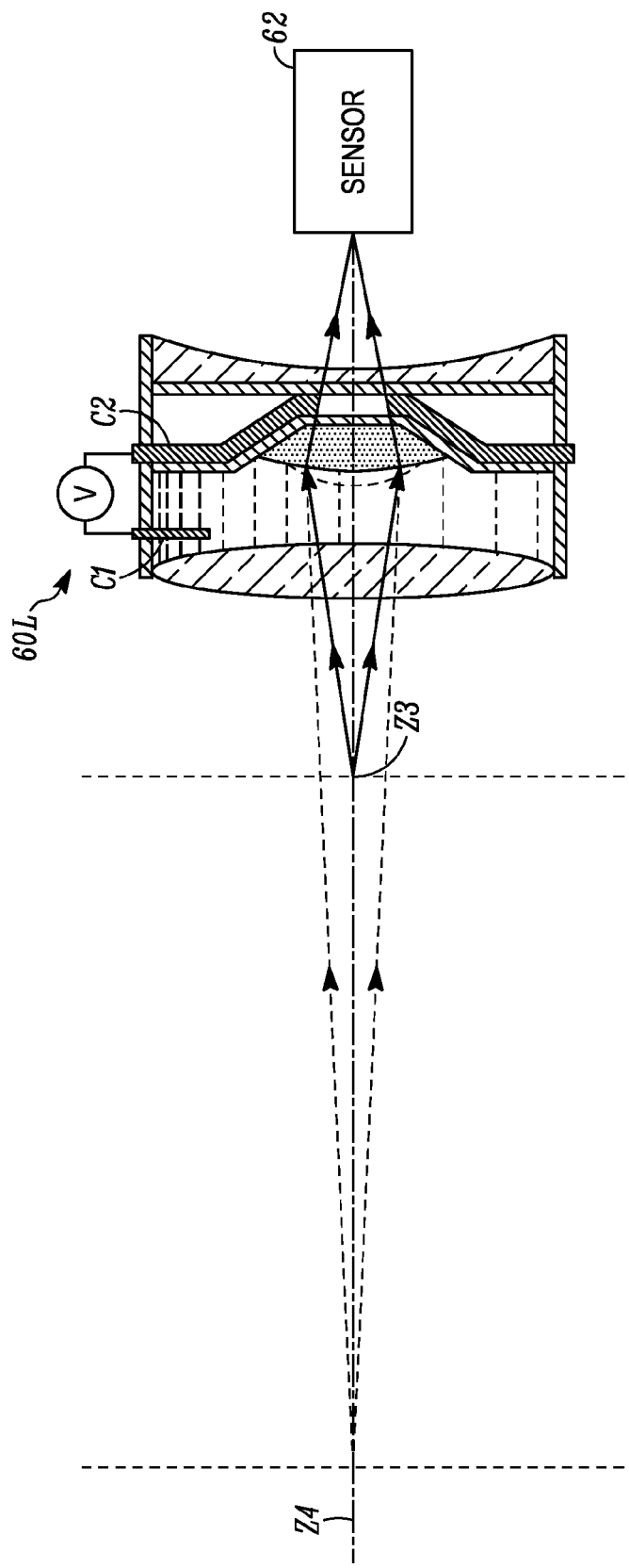
FIG. 3A depicts an example design of a liquid lens.
Figure 3B:
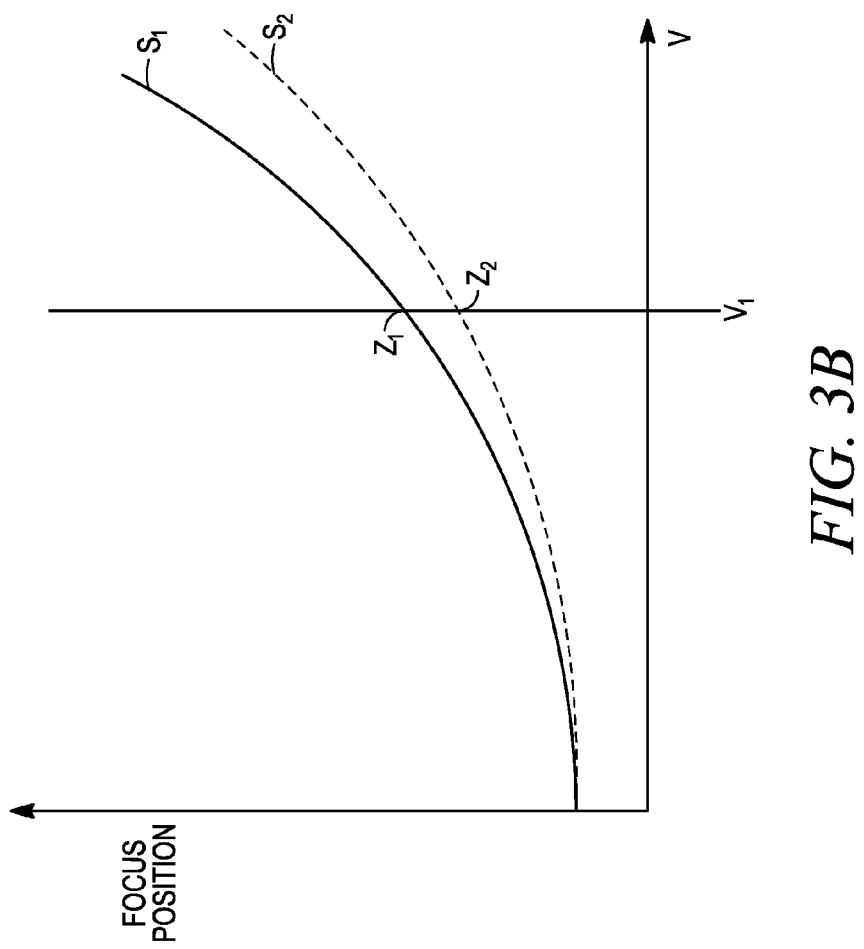
FIG. 3B depicts the focus position of the imagining system as a function of the drive voltage V for the liquid lens in accordance with some embodiments.

In FIG. 2, the imaging lens arrangement 60 may include a variable focusing element, such as a liquid lens. FIG. 3A depicts an example design of the liquid lens 60L. In FIG. 3A, the focus length of the liquid lens 60L changes with the drive voltage V applied across the conducting electrodes C1 and C2 in the liquid lens 60L. The focus plane of the imagining system in FIG. 3A also change accordingly. For example, if the focus plane is located at the focus position Z3 with one drive voltage, the focus plane may be located at another focus position Z4 with another drive voltage. In general, as shown in FIG. 3B, the focus position of the imagining system in FIG. 3A is a function of the drive voltage V for the liquid lens 60L. But, because the property of the liquid lens 60L may not be stable or constancy over its lifetime, the functional relationship between the focus position and the drive voltage V may change over time. For example, the curve S1 that represents the functional relationship initially may become the curve S2 that represents the functional relationship at a later time. Consequently, with the same drive voltage V1 applied to the liquid lens 60L, the focus plane may be located at the focus position Z1 initially but located at the focus position Z2 at a later time.

When developing a high speed autofocus system, it is desirable to use a consistent and repeatable focusing element such that a given drive voltage (or drive current) always results in a known focus position. This facilitates faster focusing methods that can quickly place the lens to the desired focus position. Most low cost focusing elements, such as those based on liquids (i.e., Liquid Lens by Varioptic) or voice-coil motors do not have this consistent property over the lifetime of the focus element.

Another example where a consistent focus element is useful is in the case of a barcode imager where perfect focus is not required to decoding a barcode. A consistent focusing element can speed up the focusing/decoding time. For example, it may be possible to use two or three well chosen focus positions to achieve similar decoding performance/range compared to a continuous focus system. If the autofocus element is consistent, the barcode scanner can simply cycle through a few pre-chosen focus positions using a lookup table specifying the required driving voltages. This results in faster decode times compared to a continuous focus system.

If an autofocus element is not consistent, the drive voltage alone will not specify the focus position. One method to determine the driving voltage to achieve a given focus position is to use a "closed loop" autofocus drive where a feedback mechanism is used to determine the actual lens position or optical power. Feedback mechanisms can include magnetic hall sensors, capacitance sensors, and optical encoders. Adding a feedback mechanism to the focusing element increases size and cost and may slow down the focusing process.

Another method to focus an inconsistent autofocus element is to use a passive autofocus algorithm that determines the best focus position (and drive voltage) by taking multiple images and searching for the drive voltage that maximizes the image sharpness. The disadvantage of using a passive autofocus method is the resulting slower focus times due to the need to acquire and analyze multiple images while searching for the best focus.

In the following, a method using the aiming pattern of the imager to perform self-calibration is disclosed. This method can transform a low cost inconsistent autofocus element into a consistent element, thereby resulting in faster focusing and decode times when used in a barcode imager.

Figure 4A:
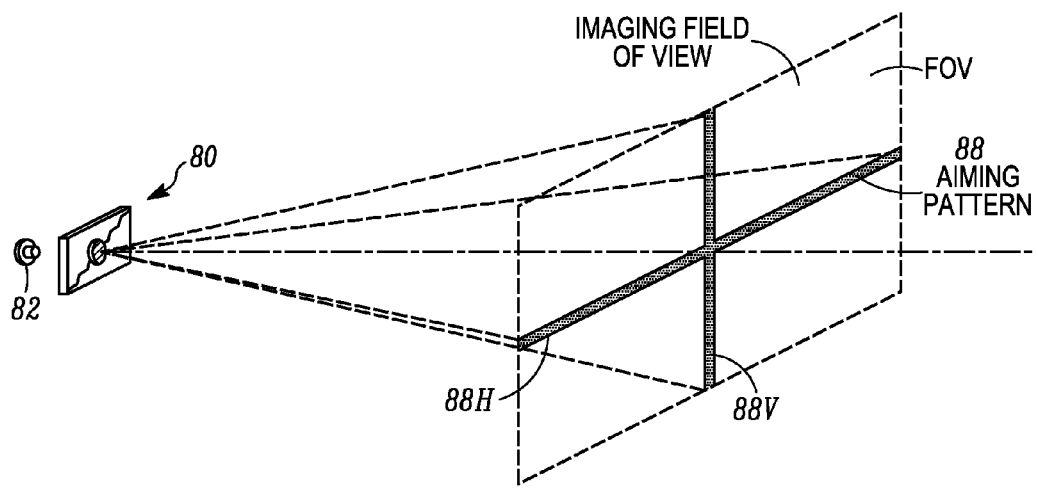
FIG. 4A shows that an aiming pattern is generated within the imaging field of view (FOV) when the visible light from the aiming light source is projected through the aiming pattern generating element in accordance with some embodiments.

Barcode imaging scanners typically project a bright aiming pattern (e.g., a dot, line, cross pattern, etc.) to assist the user in aiming the scanner towards the barcode. When aimed properly, the aiming pattern will be projected onto the desired barcode. As shown in FIG. 4A, an aiming pattern 88 can be generated within the imaging field of view (FOV) when the visible light from the aiming light source is projected through the aiming pattern generating element 80. In FIG. 4A, the aiming pattern 88 is in the form of an aiming cross-wire that includes two lines of visible illumination: a horizontal line of visible illumination 88H and a vertical line of visible illumination 88V.

Figure 4B:
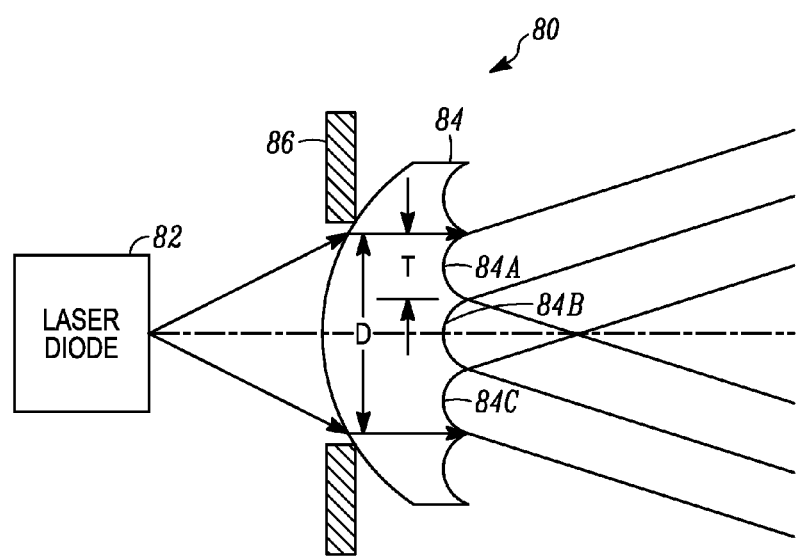
FIG. 4B shows that the aiming pattern generating element can include an aperture stop and an optical component in accordance with some embodiments.

In one implementation, as shown in FIG. 4B, the aiming pattern generating element 80 includes an aperture stop 86 and an optical component 84. The optical component 84 in FIG. 4B is a refractive optical element (ROE). Specifically, in one implementation, the rear portion of the optical component 84 is formed with a plurality of refractive structures (e.g., 84A, 84B, 84C, . . . ) for refracting the light beam from the laser diode 82. There are many possible implementations of the optical component 84. Some implementations of the optical component 84—including the implementation as shown in FIG. 4B—are described in more detail in U.S. Pat. No. 7,182,260, titled "Aiming light pattern generator in imaging readers for electro-optically reading indicia." The entire content U.S. Pat. No. 7,182,260 is hereby incorporated by reference. In some other embodiments, the optical component 84 in FIG. 4B can also be a diffractive optical element (DOE) that includes a plurality of interferometric elements for generating the aiming pattern by light interference. Some implementations of the diffractive optical element (DOE) are described in more detail in U.S. Pat. No. 6,060,722, which is hereby incorporated by reference in its entirety.

Figure 5A:
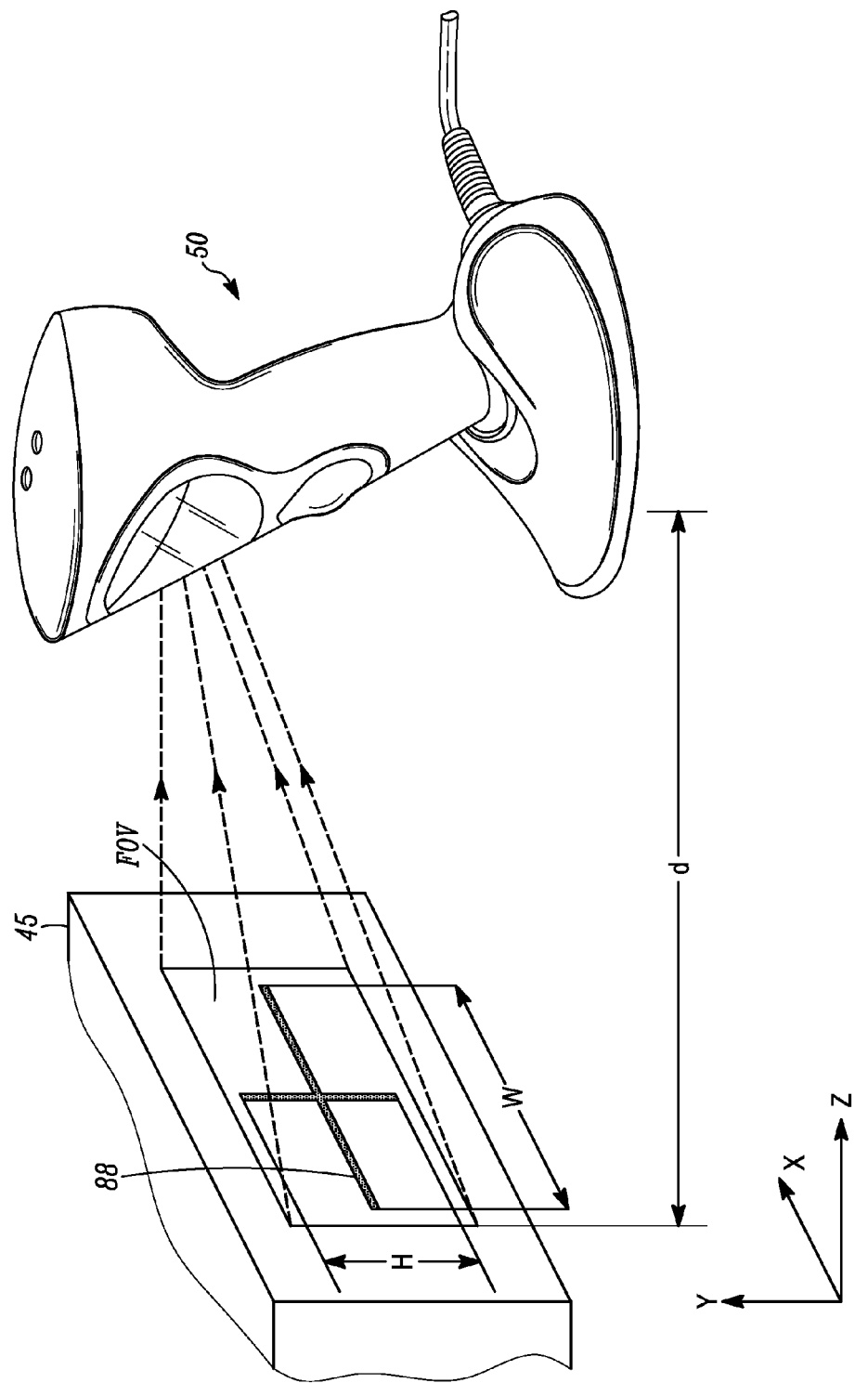
FIG. 5A shows that an image of the aiming pattern is captured by the imaging sensor in the imaging scanner when the aiming pattern is projected on the surface of a target object.
Figure 5B:
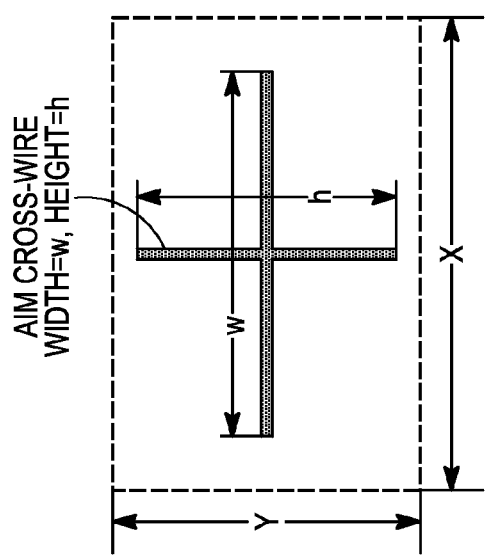
FIG. 5B illustrates the image of an aiming cross wire in the form of pixel data as captured by the imaging sensor.

As shown in FIG. 5A, when the aiming pattern 88 is projected on the surface of a target object 45, an image of the aiming pattern 88 can be captured by the imaging sensor 62 in the imaging scanner 50 to create some pixel data during an exposure time period. In one implementation, the aiming pattern 88 is in the form of an aiming cross that has a width "W" and a height "H" on the target object 45. The pixel data, as shown in FIG. 5B, includes the image of the aiming cross-wire with a width "w" and a height "h"; the pixel data has a horizontal resolution "X" and vertical resolution "Y", where the feature-size of the aiming cross-wire in the pixel data (e.g., the width "w" or the height "h") can be estimated using some known algorithms.

Figure 6A:
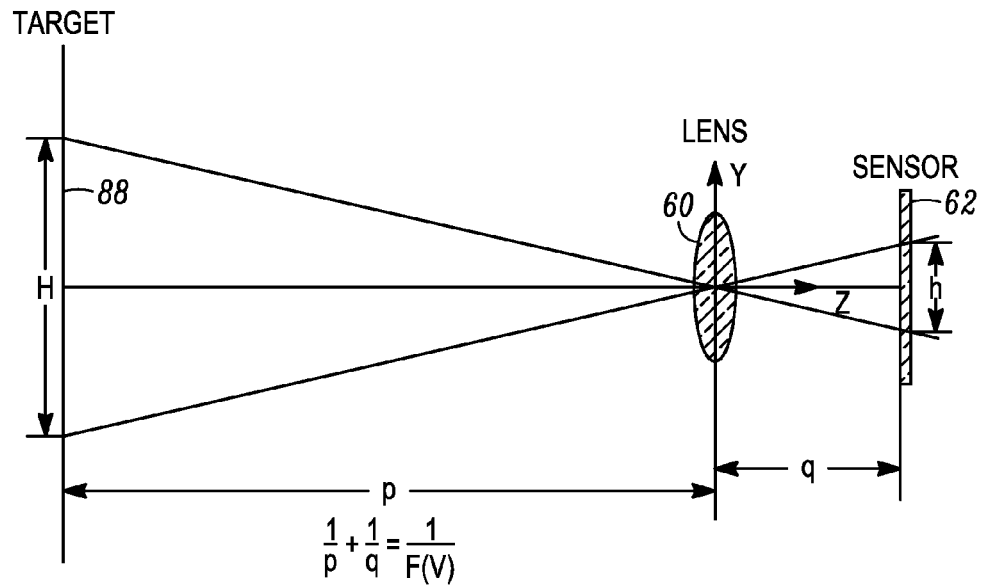
FIGS. 6A-6B shows that the size of the aiming cross-wire in the image as measured in term of the number of pixels generally depends upon both the size of the aiming cross-wire on the target object and the focus lengths "F" of the imaging lens arrangement in front of the imaging sensor.
Figure 6B:
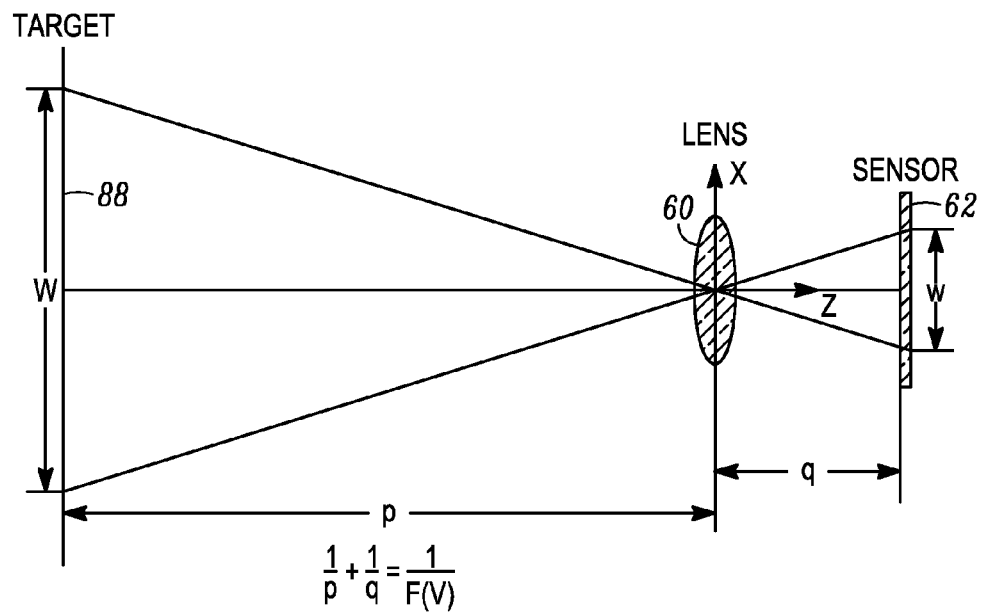

The height "h" of the aiming cross-wire in the image as measured in term of the number of pixels generally depends upon the height "H" of the aiming pattern 88 on the target object 45 and the focus lengths "F" of the imaging lens arrangement 60 in front of the imaging sensor 62. The width "w" of the aiming cross-wire in the image as measured in term of the number of pixels generally depends upon the width "W" of the aiming pattern 88 on the target object 45 and the focus lengths "F" of the imaging lens arrangement 60 in front of the imaging sensor 62. For examples, in the specific implementation as shown in FIG. 6A and FIG. 6B, the distance "p" between the target object 45 and the variable focus lens 60 is related to the distance "q" between the lens 60 and the imaging sensor 62, with the equation, $1/p+1/q=1/F(V)$, where $F(V)$ is the focus length of the variable focus lens 60 when a drive voltage V is applied to the variable focus lens 60 (e.g., a liquid lens). As shown in FIG. 6A and FIG. 6B, $h=Hq/p=HF(V)/[p-F(V)]$, and $w=Wq/p=WF(V)/[p-F(V)]$. If both the distance "p" and the size of the aiming cross on the target object 45 (e.g., "H", or "W") remain constant, it would be possible to use the feature-size of the aiming pattern in the pixel data (e.g., the width "w" or the height "h") to calibrate the drive voltage V for achieving the best focus on the target object 45. The corresponding relationship between the feature-size of the aiming cross-wire in the pixel data and the optimal drive voltage V for achieving the best focus can be stored in a calibration table.

Another feature of the aiming pattern that could be used to calibrate the drive voltage is the size a central aiming dot. In addition to a feature-size, the position of an aiming pattern feature can also be used to calibrate the drive voltage. For example, the position of a bright aiming dot within the collected image.

Figure 7A:
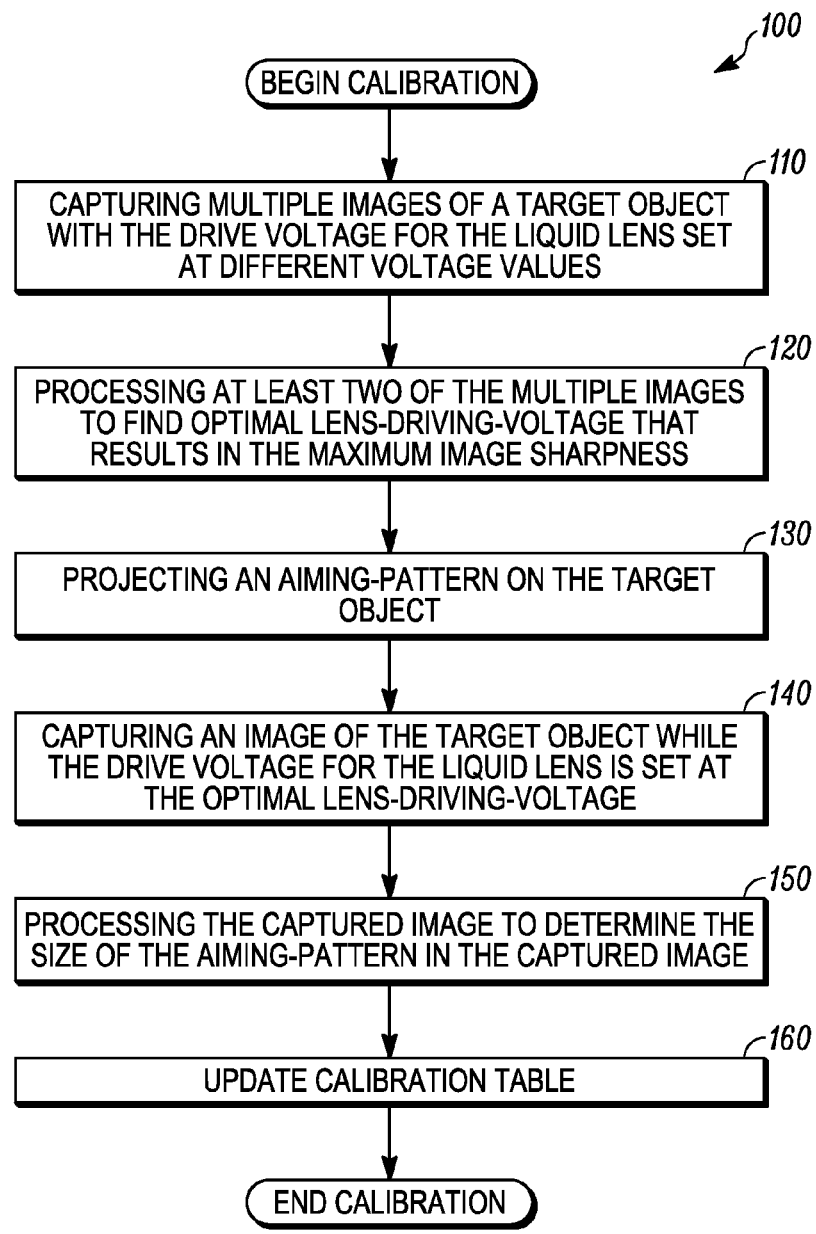
FIGS. 7A-7C are example implementations of the method for creating or updating a calibration table.
Figure 7B:
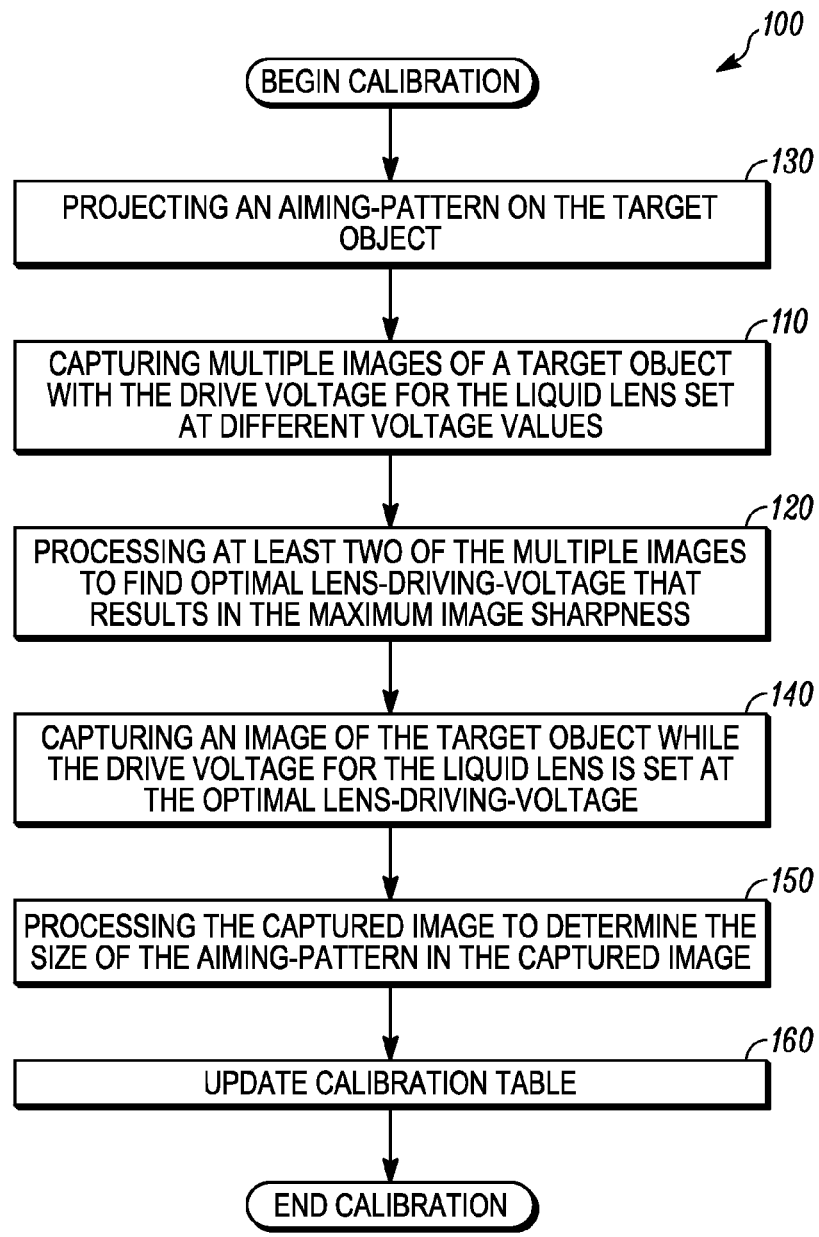
Figure 7C:
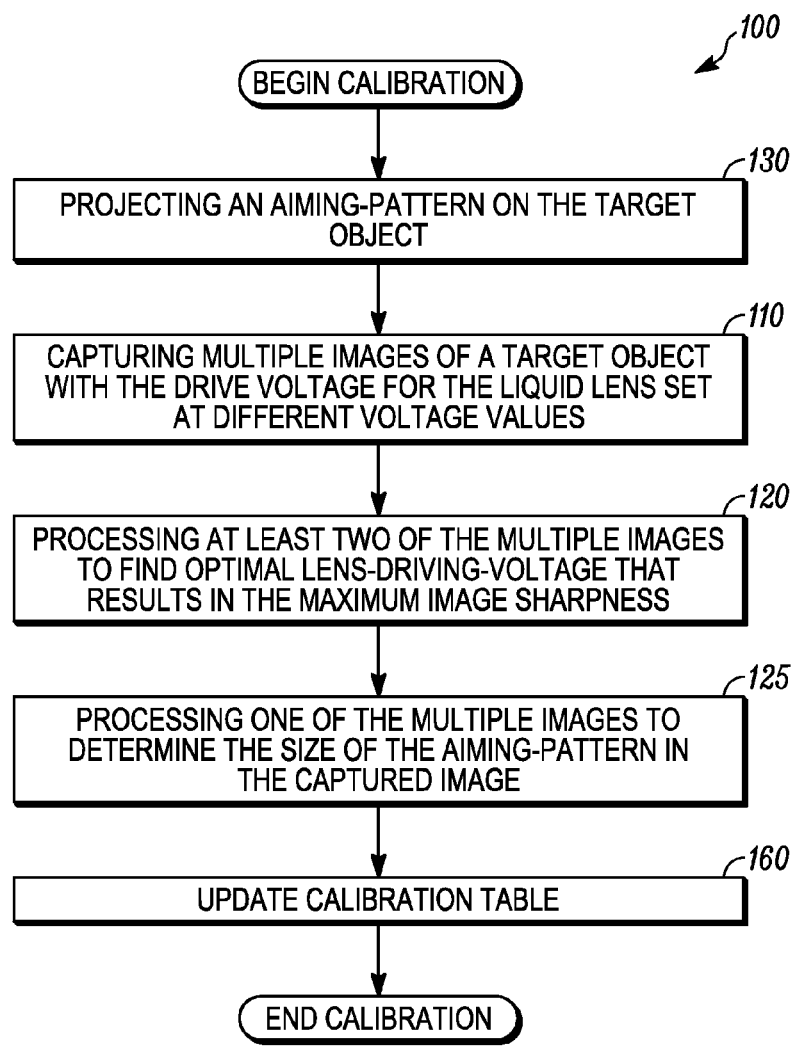

In general, the method for creating or updating a calibration table can include the following: (1) detecting light from a target object through an imaging lens arrangement with an imaging sensor having photosensitive elements to capture multiple images of the target object while substantially maintaining the distance between the target object and the imaging lens arrangement, wherein the imaging lens arrangement is configured to change a focus position thereof with a lens-driving-parameter, and wherein at least one of the multiple images is captured during a time period when an extended-aiming-pattern having at least one line of visible illumination is generated on the target object by projecting visible light through an aiming pattern generating element; (2) processing the at least one of the multiple images to determine a feature-size measuring the at least one line of visible illumination in the at least one of the multiple images; (3) processing at least two of the multiple images to find an optimal lens-driving-parameter that results in the maximum image sharpness; and (4) storing both the feature-size and the optimal lens-driving-parameter into a memory for changing a calibration table. Example implementations of such method for creating or updating a calibration table are shown in FIG. 7A, FIG. 7B, and FIG. 7C. During the lifetime of the product, the imaging system can periodically initiate a self-calibration procedure to update the initial look-up table.

As shown in FIG. 7A, at block 110 and block 120, with the drive voltage for the liquid lens set at different voltage values, multiple images of the target object are captured, and at least two of these multiple images are processed to find optimal lens-driving-voltage that results in the maximum image sharpness. People of ordinary skill can recognize that there are many passive autofocus algorithms that can be used to determines the best focus position (and drive voltage) by taking multiple images and searching for the drive voltage the results in the maximum image sharpness. There also are numerous sharpness functions and search procedures described in the current literature. Many of these autofocus algorithms, sharpness functions, and search procedures can be used at block 120 for finding the optimal lens-driving-voltage.

Figure 8:
FIG. 8 shows a calibration table storing both the size of the aiming-pattern and the optimal the optimal lens-driving-voltage in accordance with some embodiments.

In FIG. 7A, at blocks 130, 140, and 150, after an aiming-pattern is projected on the target object, an image of the target object is captured while the drive voltage for the liquid lens is set at the optimal lens-driving-voltage, and the captured image at block 140 is processed to determine the size of the aiming-pattern in the captured image. Then, at block 160, the calibration table is updated. In one implementation, updating the calibration table can involve storing both the size of the aiming-pattern and the optimal the optimal lens-driving-voltage into a look-up table 300 as shown in FIG. 8. For example, the feature-size $w_5$ and the corresponding optimal lens-driving-voltage $V_5$ can be stored in the row 350 in the look-up table 300. The feature-size and the corresponding optimal lens-driving-voltage for voltages $V_1$, $V_2$, $V_3$, $V_4$, $V_5$, $V_6$, $V_7$, $V_8$ and $V_9$ can be stored respectively in the rows 310, 320, 330, 340, 350, 360, 370, 380 and 390 in the look-up table 300. There are also other implementations for updating the calibration table. There can be other ways to combine the previous calibration data with the new self-calibration data. One method is to fit all the data (i.e., the new data and previous data) to an appropriate curve using weighted least squares. This would allow different weights to be applied to each data point. The weights can be a function of when the data was collected (e.g., newer data weighted higher than old data) and the consistency of the data. For example, data taken at a similar distance with similar results (e.g., low variance) would be weighted higher than inconsistent data.

FIG. 7B shows another example implementation of the method for creating or updating a look-up table. In FIG. 7B, the aiming-pattern is projected on the target object before the multiple images of the target object are captured. In some implementations, the image of the aiming-pattern in the multiple images can be used for finding the image with the maximum sharpness.

FIG. 7C shows a third example implementation of the method for creating or updating a look-up table. In FIG. 7C, the multiple images of the target object are captured before both the process for finding optimal lens-driving-voltage that results in the maximum image sharpness and the process for finding the size of the aiming-pattern at block 125. In some implementations, as shown in FIG. 7C, the process for finding optimal lens-driving-voltage is carried out before the process for finding the size of the aiming-pattern. In other implementations, the process for finding optimal lens-driving-voltage can be carried out after the process for finding the size of the aiming-pattern.

Figure 9:
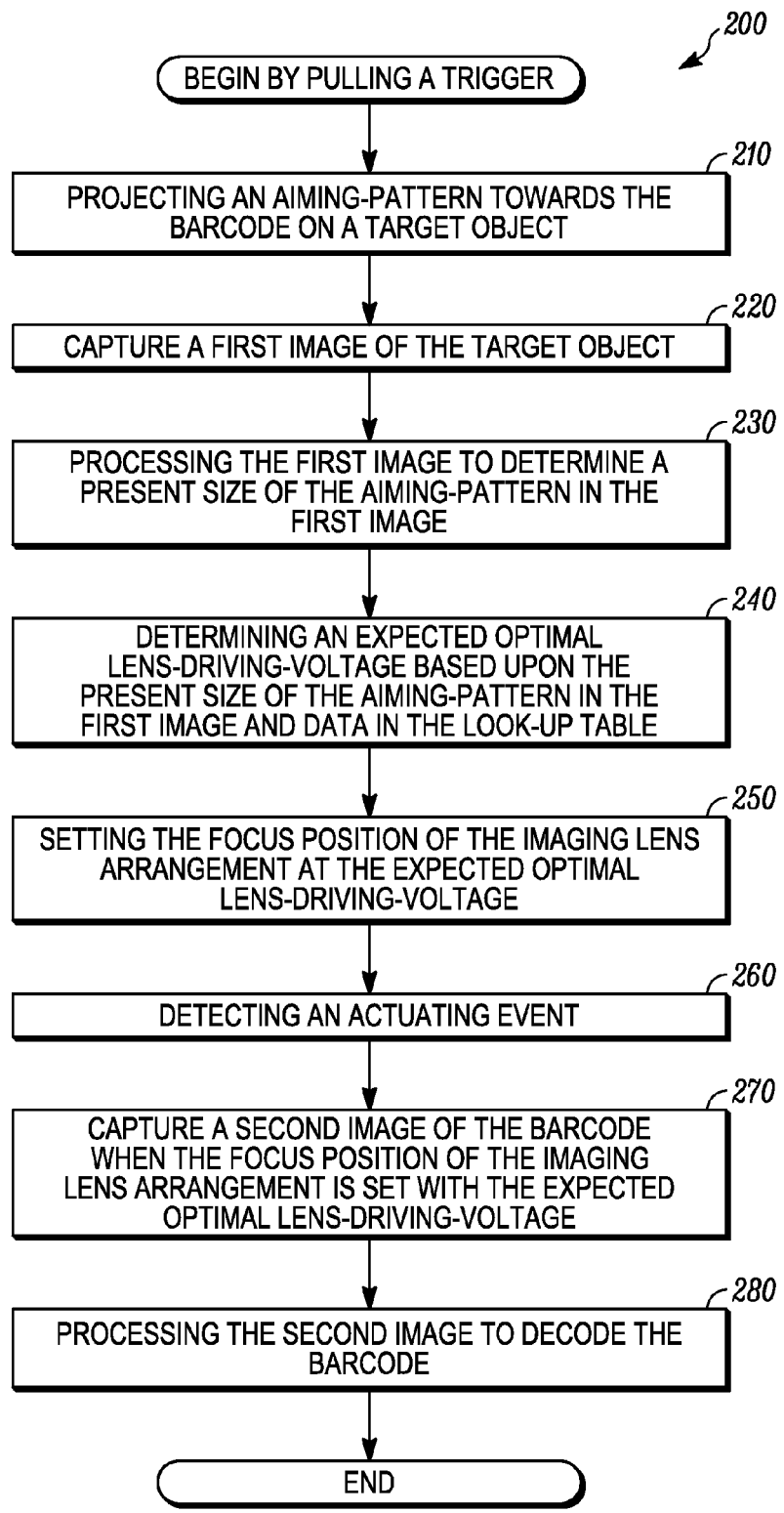
FIG. 9 shows a method for decoding a barcode in accordance with some embodiments.

FIG. 9 shows a method 200 for decoding a barcode. The method 200 begins with the pulling of a trigger. After an aiming-pattern is projected towards the barcode on a target object (at block 210), a first image of the target object is captured (at block 220), and this first image is processed to determine a present size of the aiming-pattern in the first image (at block 230). Subsequently, at block 240, an expected optimal lens-driving-voltage is determined based upon the present size of the aiming-pattern in the first image and data in a look-up table. After setting the focus position of the imaging lens arrangement at the expected optimal lens-driving-voltage (at block 250), a second image of the barcode is captured at block 270 after detecting an actuating event (at block 260), such as the pulling of another trigger. The focus position of the imaging lens arrangement can be set at the expected optimal lens-driving-voltage before the pulling of the trigger or after the pulling of the trigger. Then, at block 280, the second image is processed to decode the barcode.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Figure 10A:
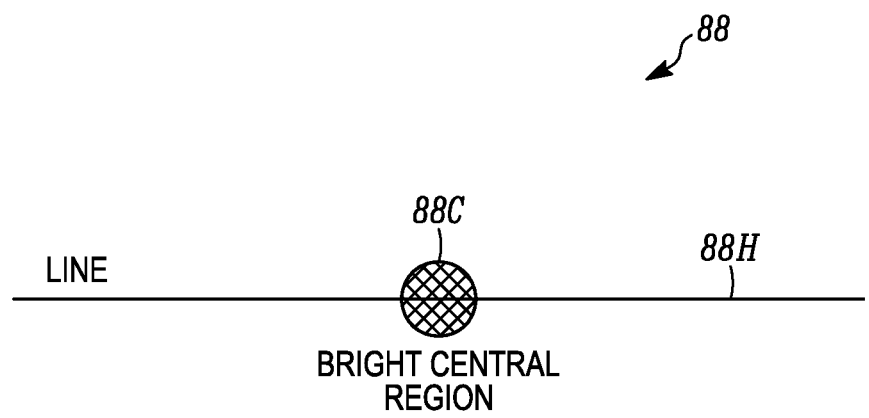
FIGS. 10A-10B depict two exemplar extended aiming patterns that can also be used for the method in FIGS. 7A-7C or in FIG. 9.
Figure 10B:
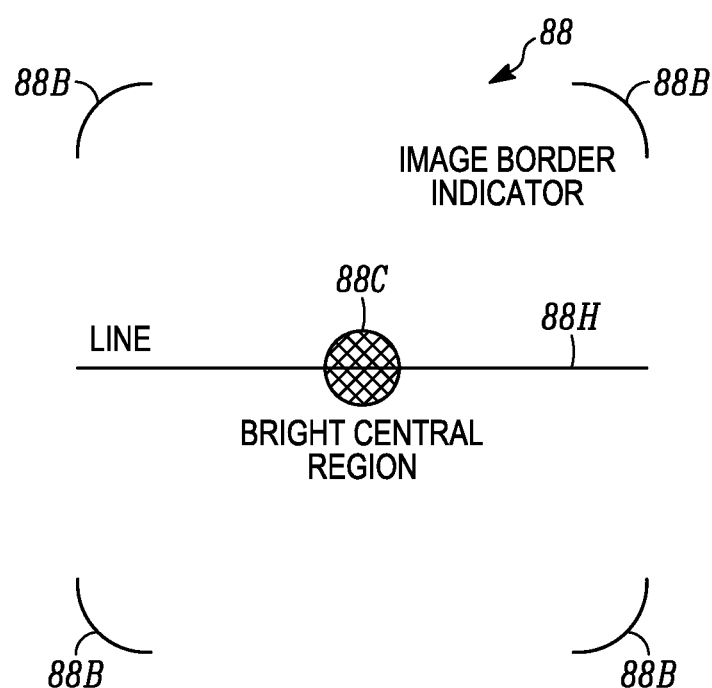

For example, In addition to the aiming cross-wire as shown FIG. 4A and FIGS. 5A-5B, other kind of extended aiming patterns can also be used for the method 100 in FIGS. 7A-7C or used for the method 200 in FIG. 9. FIGS. 10A-10B depict another two exemplar extended aiming patterns. The extended aiming pattern 88 in both FIG. 10A and FIG. 10B have a horizontal line 88H and a bright central region 88C, with the extended aiming pattern 88 in FIG. 10B include additional border marks 88B.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   detecting light from a target object through an imaging lens arrangement with an imaging sensor having photosensitive elements to capture multiple images of the target object while substantially maintaining the distance between the target object and the imaging lens arrangement, wherein the imaging lens arrangement is configured to change a focus position thereof with a lens-driving-parameter, and wherein at least one of the multiple images is captured during a time period when an extended-aiming-pattern having at least one line of visible illumination is generated on the target object by projecting visible light through an aiming pattern generating element;
   processing the at least one of the multiple images to determine a feature-size measuring a size of the at least one line of visible illumination on the same focus plane in the at least one of the multiple images;
   processing at least two of the multiple images to find an optimal lens-driving-parameter that results in the maximum image sharpness; and
   storing both the feature-size and the optimal lens-driving-parameter into a memory for changing a calibration table.

2. The method of claim 1, further comprising:
   detecting light from a barcode through the imaging lens arrangement to capture a first image of the barcode during a first time period when a second extended-aiming-pattern is generated on the barcode;
   processing the first image to determine a present feature-size measuring the at least one line of visible illumination in the first image;
   determining an expected optimal lens-driving-parameter based upon the present feature-size and data in the calibration table;
   detecting light from the barcode through the imaging lens arrangement to capture a second image of the barcode when the focus position of the imaging lens arrangement is set with the expected optimal lens-driving-parameter; and
   processing the second image to decode the barcode.

3. The method of claim 1, wherein said storing comprises:
   storing both the feature-size and the optimal lens-driving-parameter into a look-up table wherein a corresponding relationship is established between the feature-size and the optimal lens-driving-parameter.

4. The method of claim 1, wherein said detecting light from the target object to capture the multiple images of the target object comprises:
   capturing the at least one of the multiple images for determining the feature-size before capturing the at least two of the multiple images for finding the optimal lens-driving-parameter.

5. The method of claim 1, wherein said detecting light from the target object to capture the multiple images of the target object comprises:
   capturing the at least one of the multiple images for determining the feature-size after capturing the at least two of the multiple images for finding the optimal lens-driving-parameter.

6. The method of claim 1, wherein:
   the at least one of the multiple images for determining the feature-size is identical to one of the at least two of the multiple images for finding the optimal lens-driving-parameter.

7. The method of claim 1, wherein the feature-size is the number of pixels of the at least one line of visible illumination in the at least one of the multiple images.

8. The method of claim 1, wherein the aiming pattern generating element includes at least one of a refractive optical element (ROE) and a diffractive optical element (DOE).

9. The method of claim 1, wherein the imaging lens arrangement includes a liquid lens having a focus length thereof controllable with the lens-driving-parameter.

10. The method of claim 1, wherein the lens-driving-parameter includes a drive voltage.

11. The method of claim 1, wherein the lens-driving-parameter includes a drive current.

12. A method comprising:
    generating an extended-aiming-pattern having at least one line of visible illumination on a target object by projecting visible light through an aiming pattern generating element upon detecting a triggering event;
    detecting light from a barcode through an imaging lens arrangement with an imaging sensor having photosensitive elements to capture a first image of the barcode on the target object during a first time period when the extended-aiming-pattern is on the target object;
    processing the first image to determine a present feature-size measuring a size of the at least one line of visible illumination on the same focus plane in the first image;
    upon detecting an actuating event, detecting light from the barcode through the imaging lens arrangement to capture a second image of the barcode when a lens-driving-parameter for the imaging lens arrangement is set with an expected optimal lens-driving-parameter, wherein the expected optimal lens-driving-parameter is determined from the present feature-size and data in a calibration table for establishing a corresponding relationship between a feature-size and an optimal lens-driving-parameter; and
    processing the second image to decode the barcode.

13. An apparatus comprising:
    an aiming pattern generating element;
    an aiming light source configured to project visible light through the aiming pattern generating element to generate an extended-aiming-pattern on a target object, the extended-aiming-pattern including at least one line of visible illumination;
    an illumination source operative to generate an illumination light projected towards the target object;
    an imaging lens arrangement configured to change a focus position thereof with a lens-driving-parameter;
    an imaging sensor having photosensitive elements configured to detect light from the target object through the imaging lens arrangement and configured to capture multiple images of the target object while substantially maintaining the distance between the target object and the imaging lens arrangement, with at least one of the multiple images being captured during a time period when the extended-aiming-pattern is generated on the target object;

a controller for processing the at least one of the multiple images to determine a feature-size measuring a size of the at least one line of visible illumination on the same focus plane in the at least one of the multiple images, and for processing at least two of the multiple images to find an optimal lens-driving-parameter that results in the maximum image sharpness; and a memory configured to store both the feature-size and the optimal lens-driving-parameter into a look-up table having a corresponding relationship established between the feature-size and the optimal lens-driving-parameter.

14. The apparatus of claim 13, wherein:
the at least one of the multiple images for determining the feature-size is captured before capturing the at least two of the multiple images for finding the optimal lens-driving-parameter.

15. The apparatus of claim 13, wherein:
the at least one of the multiple images for determining the feature-size is captured after capturing the at least two of the multiple images for finding the optimal lens-driving-parameter.

16. The apparatus of claim 13, wherein:
the at least one of the multiple images for determining the feature-size is identical to one of the at least two of the multiple images for finding the optimal lens-driving-parameter.

17. The apparatus of claim 13, wherein the aiming pattern generating element comprises at least one of a refractive optical element (ROE) and a diffractive optical element (DOE).

18. The apparatus of claim 13, wherein the feature-size is the number of pixels of the at least one line of visible illumination in the at least one of the multiple images.

19. The apparatus of claim 13, wherein the imaging lens arrangement includes a liquid lens having a focus lens thereof controllable with the lens-driving-parameter.

20. The apparatus of claim 13, wherein the lens-driving-parameter includes one of a drive voltage and a drive current.

* * * * *